United States Patent [19]

Ingram

[11] 4,172,788
[45] Oct. 30, 1979

[54] CAUSTIC CHLORINE FILTER BAG

[76] Inventor: Alton E. Ingram, 1185 Pear St., Baton Rouge, La. 70802

[21] Appl. No.: 891,980

[22] Filed: Mar. 30, 1978

Related U.S. Application Data

[63] Continuation of Ser. No. 772,607, Feb. 28, 1977, abandoned.

[51] Int. Cl.$^2$ ............................................. B01D 29/14
[52] U.S. Cl. ..................................... 210/65; 210/483; 210/500 R
[58] Field of Search .................. 210/446, 62, 483, 484, 210/485, 507, 499, 65, 500 R; 423/503, 504, 505

[56] References Cited

U.S. PATENT DOCUMENTS

| 3,419,151 | 12/1968 | Smith et al. | 210/499 |
| 3,436,345 | 4/1969 | Goodenough et al. | 210/62 |

Primary Examiner—Frank Sever

Attorney, Agent, or Firm—James B. Lake, Jr.

[57] ABSTRACT

The filter is made of monofilament polypropylene, a comparatively fragile material but chemically adapted for the purposes, in the shape of a pillow case with a long edge opening and oppositely, adjacent an end thereof, a conduit opening. All edges are reinforced with a strip of felted polypropylene, a comparatively heavy and strong material and also chemically adapted for use with caustic chlorine. The filter is additionally reinforced with pads of the same felted material where supported in a container. In use, a flat filter leaf with a conduit is inserted into the filter through the opening with the conduit opening coinciding with the conduit, and the long edge opening tightly sewn together. Caustic chlorine is introduced into the filter through the conduit opening and filter leaf, and escapes into the container through the filter free of salt. Both the monofilament and felted polypropylene define minute interstices that are impervious to salt but not to chlorine.

1 Claim, 3 Drawing Figures

CAUSTIC CHLORINE FILTER BAG

This is a continuation of application Ser. No. 772,607, filed Feb. 28, 1977, now abandoned.

BACKGROUND OF THE INVENTION

The invention relates to filters and more particularly to bag filters for use with caustic chlorine.

Prior art discloses sheets of microporous plastic film that is reinforced by embedding mesh fabric structures in the plastic film, see R. A. Cotton, U.S. Pat. No. 2,944,017, column 2, lines 40-47. Also a vacuum cleaner filter bag having a felt-like insert for trapping fine dust particles is disclosed by J. J. Fesco, U.S. Pat. No. 3,498,031, column 2, lines 1-2. And a filter bag of impermeable thermoplastic material having a neck portion for use in mechanical parts washer is taught by K. G. Otzen, U.S. Pat. No. 3,960,728.

SUMMARY OF THE INVENTION

It is an object of the invention to provide a bag filter adapted chemically for use with caustic chlorine and that is strong enough to need service about every six months rather than about every six weeks.

Another object is to provide a caustic chlorine filter bag that is strengthened with no reduction of the filtering area of said filter bag.

DETAILED DESCRIPTION OF THE INVENTION

Figure 1:
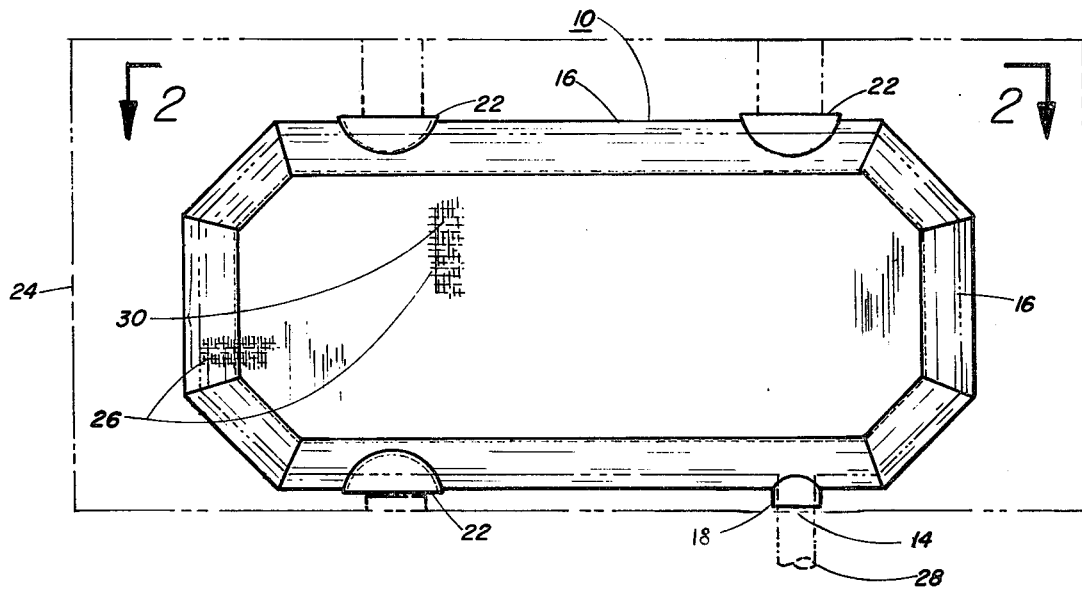
FIG. 1 is a side elevation of the invention.
Figure 2:
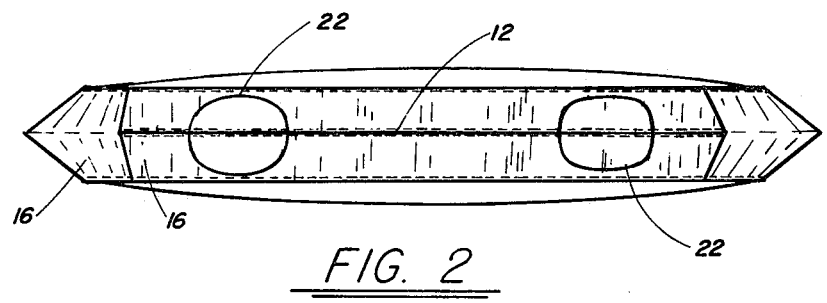
FIG. 2 is a top view of the invention with insert through open side.
Figure 3:
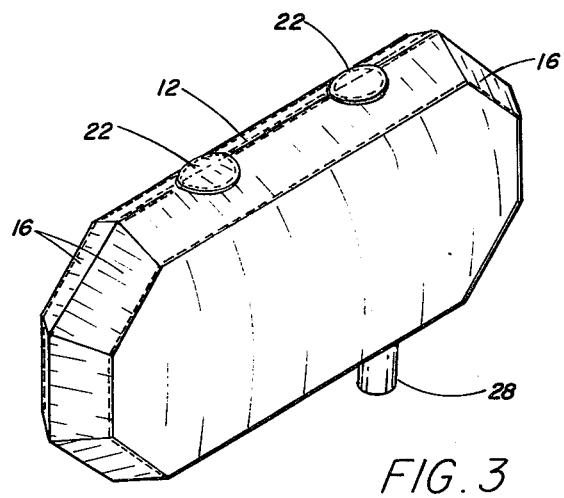
FIG. 3 is a three dimensional top view of the invention in operative condition.

Referring to FIGS. 1 and 2, the invention comprises a pillow shaped bag 10 having two long edges, one defining an opening 12 and the other a conduit opening 14. The edges of the bag 10 are reinforced by felted strips 16 of the same polypropylene that in the form of monofilament woven cloth constitutes the unreinforced bag. The sides 18 of conduit opening 14 extend downwardly for securing around a conduit as by clamps. Two reinforcing pads 22 are sewed to the reinforced long edge opening 12 where the bag 10 is externally supported, and one reinforcing pad 22 is sewed to said long edge of conduit opening 14.

In use the filter bag is mounted in a closed container 24 and encloses a filter leaf 26 that is supplied thru a conduit 28 with unfiltered chlorine under pressure. The caustic chlorine passes through the meshes 30 in the filter leaf 26 and out of interstices of the bag and its reinforcements, being filtered thereby into said container 24 where it is drawn off for use.

The use of the felted reinforcing strips in combination with the monofilament polypropylene cloth provides full filtering area undiminished by reinforcements and strengthened to provide six months service approximately over the usual six weeks for unreinforced filter bags.

What is claimed is:

1. The method of filtering caustic chlorine free of contaminants comprising the steps of:
   (a) enclosing a filter leaf, supported in a container, in a filter bag of pre-selected size and shape and made of chlorine resistant filaments woven into a chlorine porous and fragile material having a high filter rate;
   (b) reinforcing all edges and corners and support areas of said filter bag with the same chlorine resistant filaments felted into a chlorine porous strong material having a lesser filter rate; and
   (c) introducing caustic chlorine by conduit and under pressure into said filter leaf for filtration through said leaf and enclosing filter bag at substantially the same high filter rate of said fragile material but for periods of use four times as long as a filter bag not having such reinforcing, and without the introduction of extraneous matter and possible chemical reaction.

* * * * *